W. A. GEIGER.
HAND BRAKE.
APPLICATION FILED APR. 3, 1919.
1,403,155.
Patented Jan. 10, 1922.
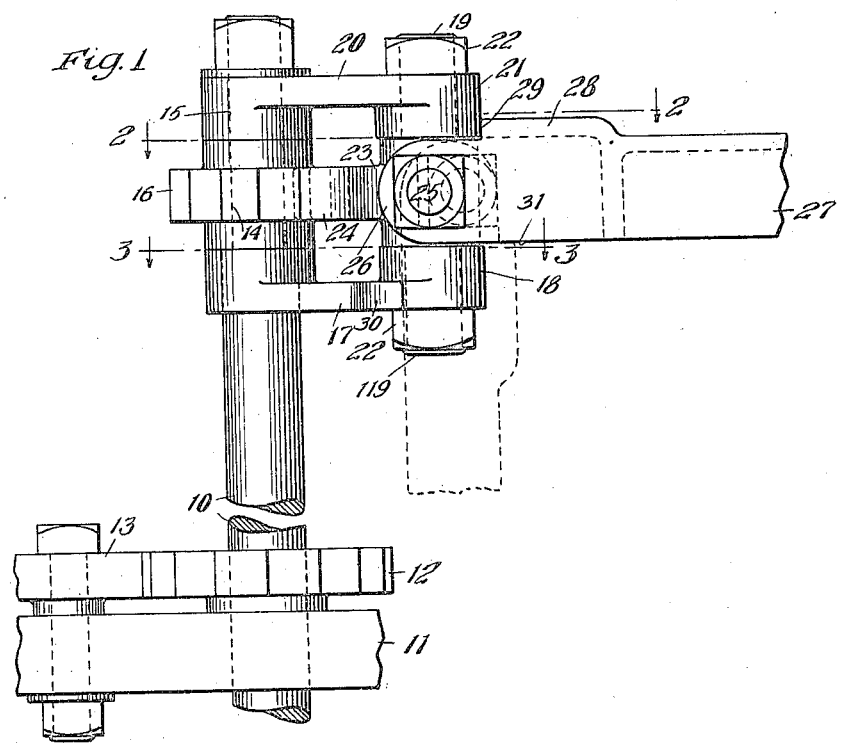
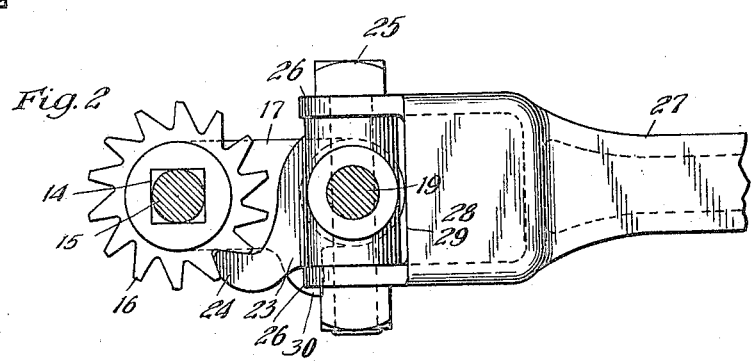
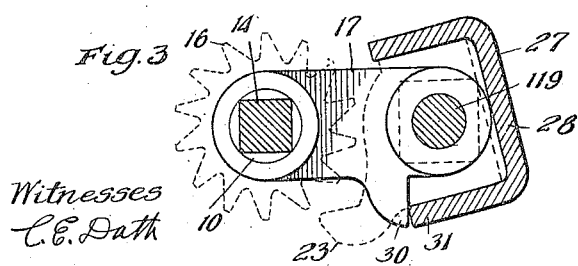
Witnesses
C. E. Dath
Inventor
William A. Geiger
by George I. Haight
his Atty.

UNITED STATES PATENT OFFICE.

WILLIAM A. GEIGER, OF CHICAGO, ILLINOIS, ASSIGNOR TO WILLIAM H. MINER, OF CHAZY, NEW YORK.

HAND BRAKE.

1,403,155.  Specification of Letters Patent.  Patented Jan. 10, 1922.

Application filed April 3, 1919. Serial No. 287,216.

*To all whom it may concern:*

Be it known that I, WILLIAM A. GEIGER, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to improvements in hand brakes.

The object of the invention is to provide a simple and efficient hand brake particularly adapted for use on freight cars.

In the drawings forming a part of this specification, Figure 1 is an elevational view of a portion of a hand brake of a freight car showing my improvements in connection therewith. Parts of the vertical brake staff are broken away in order to better accommodate the view on the sheet. And Figs. 2 and 3 are horizontal, sectional views taken on the lines 2—2 and 3—3, respectively, of Fig. 1. In Fig. 3, the operating lever is in its depending vertical position and the section thereof is made correspondingly.

In said drawings, 10 denotes a vertical brake staff of a hand brake arrangement such as is most common on railway box cars and other freight cars. As customary, the same passes through a platform 11 on which the brakeman usually stands when applying the brake and immediately adjacent said platform, the staff 10 has rigidly secured thereto in any suitable manner a ratchet wheel 12 with which is adapted to cooperate a foot-controlled locking dog 13.

At the upper end of the staff 10, the same is provided with a squared or other non-circular section 14 and above that a round section 15 of lesser diameter than the diameter of the main portion of the staff. Mounted on the squared section 14 of the staff is a ratchet wheel 16, the same, of course, being rotatable in unison with the staff at all times.

Rotatably or oscillatably mounted on the staff 10 below the ratchet wheel 16 is an arm 17 extending radially and having an enlarged outer end 18 adapted to form a bearing. Also, mounted on the staff 10 above the ratchet wheel 16 and on the reduced circular section 15 is another arm 20 which extends radially and is provided at its outer end with an enlargement 21 adapted also to form a bearing. Interposed between the arms 17 and 20 is a pawl 23 having a tooth 24 oscillatable in the plane of the ratchet wheel 16 and cooperable with the teeth of the latter. Said pawl 23 has an enlarged hub fitting between the bosses 18 and 21 of the supporting arms 17 and 20. Said hub has preferably formed integral therewith upwardly and downwardly extending circular lugs 19 and 119 journaled in said enlarged ends 18 and 21 and forming a pivotal mounting for the pawl 23 about a vertical axis or axis parallel to the staff 10. The lugs 19 and 119 are preferably threaded to accommodate nuts 22 by which all the parts are held in assembled relation.

Extending transversely through the hub of the pawl 23 and centrally thereof, is a pivot forming bolt 25 carrying the forked ends 26—26 of an operating lever or handle 27. The handle 27 is shown by full lines in Figs. 1 and 2 in its horizontal operative position, but it is evident that the same is adapted to fall, under the influence of gravity, to a depending vertical position as indicated by the dotted lines in Fig. 1. In order to limit the upward movement of the handle 27 so that it cannot pass beyond a horizontal position, the same is formed with a transverse web or wall 28 having an inner edge 29 acting as a shoulder to engage the bearing 21 of the upper arm 20 as shown in Fig. 1.

In the operation of railway hand brakes, it is of course essential that the pawl of the winding ratchet mechanism be out of engagement with its cooperating ratchet wheel in order to prevent possibility of the operating handle being suddenly swung so as to hit the brakeman. In order to accomplish this result and do it automatically, I provide a laterally extending lug or cam 30 on the lower arm 17 with which the flange 31 of the handle 27 is adapted to engage as the handle 27 falls to its vertical position. This is shown by the dotted lines in Fig. 1 and by Fig. 3. The operative edge of the lug or cam 30 is so placed that the handle 27 and pawl 23 will be forced to turn about the vertical axis of the pawl sufficiently to throw the tooth 24 of the pawl out of engagement with the ratchet wheel 16, as shown in Fig. 3. In this manner, the tooth 24 will be positively thrown out of engagement from the ratchet wheel when the handle 27 reaches its depending vertical inoperative position.

The operation is as follows: Assuming the handle 27 in its vertical inoperative position, the brakeman first elevates the same to horizontal position and then pulls the handle toward him to engage the tooth 24 with the ratchet wheel 16. Continued movement of the handle in the direction indicated will, of course, rotate the staff 10 in a clockwise direction as viewed in Figs. 2 and 3. The staff 10 is held against reverse rotation by the foot-operated dog 13 and ratchet wheel 12 in the usual manner. Having rotated the staff a partial rotation as indicated, the brakeman then moves the handle 27 in a counterclockwise direction until a new engagement is effected with the ratchet wheel 16, the operation being repeated as much as necessary. When the brake chain is sufficiently tightened, the brakeman releases the handle 27 which falls to its inoperative position, simultaneously disengaging the tooth 24 from the ratchet wheel 14. When it is desired to release the brake chain, the brakeman merely kicks out the dog 13 in the usual manner.

I claim:

1. In a brake, the combination with a brake staff having a ratchet wheel rotatable in unison therewith, of supporting means oscillatably mounted with respect to said staff in proximity to said ratchet wheel, an operating handle pivotally attached to said supporting means by a universal joint, and a pawl cooperable with said ratchet wheel and limited to oscillation in the plane thereof about a pivotal axis coinciding with one of the axes of said universal joint.

2. In a brake, the combination with a brake staff having a ratchet wheel rotatable in unison therewith, of supporting means oscillatably mounted with respect to said staff in proximity to said ratchet wheel, an operating handle pivotally supported from said means to swing about an axis parallel to the axis of the staff, a pawl cooperable with said ratchet wheel and also pivotally mounted from said means about said pivot, and limited to oscillation in the plane of said ratchet wheel, said handle being also pivotally mounted to swing about another axis perpendicular to the first named axis and adapted to fall under the influence of gravity, and means for moving said pawl out of engagement with the ratchet wheel when said handle falls under the influence of gravity.

3. In a brake, the combination with a brake staff having a ratchet wheel rotatable in unison therewith, of supporting means oscillatably mounted with respect to said staff adjacent said ratchet wheel, a pawl cooperable with said ratchet wheel and limited to oscillation in the plane of said ratchet wheel, and an operating handle, said pawl and handle being pivotally mounted about an axis parallel to the axis of the staff and both supported by said means, oscillation of said handle about said pivot effecting simultaneous oscillation of the pawl, said handle being also pivotally mounted about another axis perpendicular to the first named pivotal axis.

4. In a brake, the combination with a vertical brake staff having a ratchet wheel rotatable in unison therewith, of a pair of arms oscillatably mounted on said staff on opposite sides of said ratchet wheel, a pawl cooperable with said ratchet wheel and provided with pivotal bearings in said arms, said pawl being oscillatable in the plane of the ratchet wheel, and an operating handle pivotally mounted on said pawl about an axis perpendicular to the pivotal axis of oscillation of said pawl, said handle being adapted to fall about the second named pivotal axis, under the influence of gravity, to a depending inoperative position.

5. In a brake, the combination with a vertical brake staff having a ratchet wheel rotatable in unison therewith, of a pair of arms oscillatably mounted on said staff on opposite sides of said ratchet wheel, a pawl cooperable with said ratchet wheel and provided with pivotal bearings in said arms, said pawl being oscillatable in the plane of the ratchet wheel, an operating handle pivotally mounted on said pawl about an axis perpendicular to the pivotal axis of oscillation of said pawl, said handle being adapted to fall about the second named pivotal axis, under the influence of gravity, to a depending inoperative position, and cooperating means on the lower of said supporting arms and said handle adapted to effect oscillation of the handle and pawl about the first named pivotal axis, as the handle falls, to disengage the pawl from the ratchet wheel.

In witness that I claim the foregoing I have hereunto subscribed my name this 28th day of March, 1919.

WILLIAM A. GEIGER.

Witness:
CARRIE GAILING.